US012487617B2

(12) United States Patent
Narwal et al.

(10) Patent No.: US 12,487,617 B2
(45) Date of Patent: Dec. 2, 2025

(54) ANALOG VOLTAGE REGULATOR WITH REFERENCE MODULATION

(71) Applicant: STMicroelectronics International N.V., Geneva (CH)

(72) Inventors: Rajesh Narwal, Greater Noida (IN); Shashwat, Kaushambi (IN)

(73) Assignee: STMicroeletronics International N.V., Geneva (CH)

( * ) Notice: Subject to any disclaimer, the term of this patent is extended or adjusted under 35 U.S.C. 154(b) by 239 days.

(21) Appl. No.: 18/326,876

(22) Filed: May 31, 2023

(65) Prior Publication Data

US 2024/0402738 A1 Dec. 5, 2024

(51) Int. Cl.
*G05F 1/46* (2006.01)
*G05F 1/575* (2006.01)

(52) U.S. Cl.
CPC .............. *G05F 1/468* (2013.01); *G05F 1/575* (2013.01)

(58) Field of Classification Search
CPC ................................. G05F 1/468; G05F 1/575
See application file for complete search history.

(56) References Cited

U.S. PATENT DOCUMENTS 7,397,226 B1 7/2008 Mannama et al.
7,589,507 B2 9/2009 Mandal
9,577,613 B2 2/2017 Yang et al.
10,146,240 B1 12/2018 Wang et al.
10,185,344 B1 * 1/2019 Kadanka ................ G05F 3/247
2003/0178976 A1 9/2003 Xi
2003/0214275 A1 * 11/2003 Biagi ...................... G05F 1/575 323/280
2016/0154415 A1 6/2016 Bîzîitu et al.
2017/0351289 A1 12/2017 Narwal
2018/0120879 A1 * 5/2018 Du .......................... G05F 1/575
2020/0220501 A1 * 7/2020 Sun ..................... H03F 3/45775
2021/0034087 A1 2/2021 Liu et al.
2022/0011797 A1 * 1/2022 Prakash .................. G05F 1/468
2022/0276666 A1 * 9/2022 Wu ......................... H03F 1/083
2023/0266783 A1 * 8/2023 Deng ...................... G05F 1/467 323/280

OTHER PUBLICATIONS

Choi et al., "Design of LDO Linear Regulator with Ultra Low-Output Impedance Buffer," 2009 International SoC Design Conference (ISOCC), Busan, Korea (South), 2009, pp. 420-423.

* cited by examiner

*Primary Examiner* — Monica Lewis
*Assistant Examiner* — Lakaisha Jackson
(74) *Attorney, Agent, or Firm* — Seed Intellectual Property Law Group LLP

(57) ABSTRACT

The present disclosure is directed to a fully analog voltage regulator circuit with reference modulation. The voltage regulator circuit includes a low-dropout regulator, a voltage-to-current convert, a resistor-capacitor filter circuit, and an operational amplifier voltage buffer. The voltage regulator circuit minimizes dropout voltage of the circuit by comparing the output voltage of the voltage regulator to a reference voltage and adjusting the output voltage of the op amp voltage buffer, accordingly. The voltage regulator circuit includes two operational amplifiers, wherein the negative input of a first of the two operational amplifiers is coupled to the negative input of a second of the two operational amplifiers through the resistor-capacitor filter circuit.

20 Claims, 2 Drawing Sheets

ANALOG VOLTAGE REGULATOR WITH REFERENCE MODULATION

BACKGROUND

Technical Field

The present disclosure relates to a voltage regulator circuit including a low-dropout regulator and a resistor-capacitor (RC) filter.

Description of the Related Art

Voltage regulators are electronic devices designed to stabilize the output voltage of a circuit. There are several types of existing voltage regulators, including linear regulators and switching regulators. Several variations of each of these types of voltage regulators exist, such as low-dropout regulators, buck-boost switching regulators, and flyback switching regulators. These variations provide different trade-offs between efficiency, cost, output voltage range, output current capability, and complexity.

However, known voltage regulators suffer from several key disadvantages. For example, to maintain accuracy at a high load current, known voltage regulators require a large off-chip capacitor, which is expensive and results in a lower bandwidth with respect to the change in the load. Lower bandwidth corresponds to an increase in the reaction time of the regulator in response to a change in the load current. When a smaller off-chip capacitor is used, the DC gain of the loop is compromised to maintain stability in the system. Additionally, to improve accuracy, some known voltage regulators utilize multiple comparators, which results in excessive power consumption and occupies a large amount of space. Lastly, when digital and analog circuitry is combined in a voltage regulator, stability of the two components may be more delicate and the circuitry may have a larger form factor.

BRIEF SUMMARY

The present disclosure is directed to a fully analog voltage regulator circuit with reference modulation. More specifically, the voltage regulator circuit includes a low-dropout regulator, a voltage-to-current convert, a resistor-capacitor (RC) filter, and an operational amplifier (op amp) in inverting configuration.

The voltage regulator minimizes dropout voltage of the circuit by comparing the output voltage of the voltage regulator to a reference voltage, then adjusting the output voltage of the op amp voltage buffer, accordingly. If there is no voltage difference between the reference voltage and the output voltage of the voltage regulator, the output voltage of the op amp buffer will be equal to the output voltage of the voltage regulator. If there is a voltage difference between the reference voltage and the output voltage of the voltage regulator, the output voltage of the op amp buffer will be increased by a voltage equal to the difference.

The present disclosure overcomes the drawbacks of the prior art. The reference modulation circuitry is implemented as an inverting amplifier where the difference between the reference voltage and the output voltage of the voltage regulator is converted to a proportional current and added back to the reference voltage. The reference correction improves the accuracy of the system. Additionally, since the circuit is fully analog, the system is more accurate and stability verification is less complex than in a digital system.

Lastly, since the off-chip capacitor does not need to be larger, the voltage regulator has improved load regulation without sacrificing bandwidth or cost.

BRIEF DESCRIPTION OF THE SEVERAL VIEWS OF THE DRAWINGS

For a better understanding of the present disclosure, one or more embodiments will now be described by way of example only, with reference to the accompanying drawings. In the drawings, identical reference numbers identify similar elements or acts. In some figures, the structures are drawn exactly to scale. In other figures, the sizes and relative positions of elements in the drawings are not necessarily drawn to scale. For example, the sizes, shapes of various elements and angles may be enlarged and positioned in the figures to improve drawing legibility.

DETAILED DESCRIPTION

Figure 1:
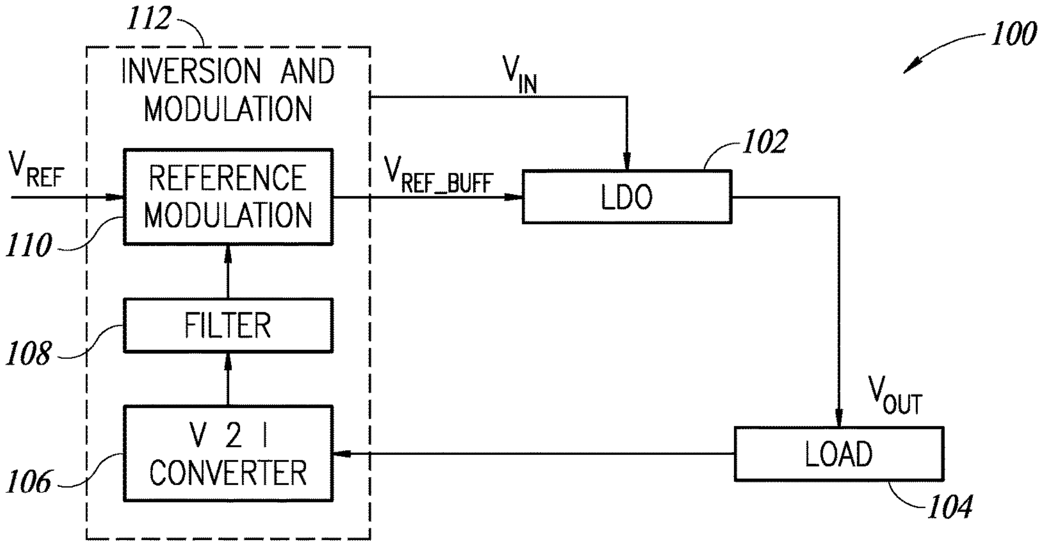
FIG. 1 schematically shows a voltage regulator circuit with reference modulation.

FIG. 1 is a voltage regulator circuit 100 including a low-dropout regulator 102, a load circuit 104 coupled to the low-dropout regulator 102, a voltage-to-current converter 106 coupled to the load circuit 104, an RC filter 108 coupled to the voltage-to-current converter 106, and an operational amplifier (Op Amp) voltage buffer 110 coupled between the RC filter 106 and the low-dropout regulator 102.

Figure 2:
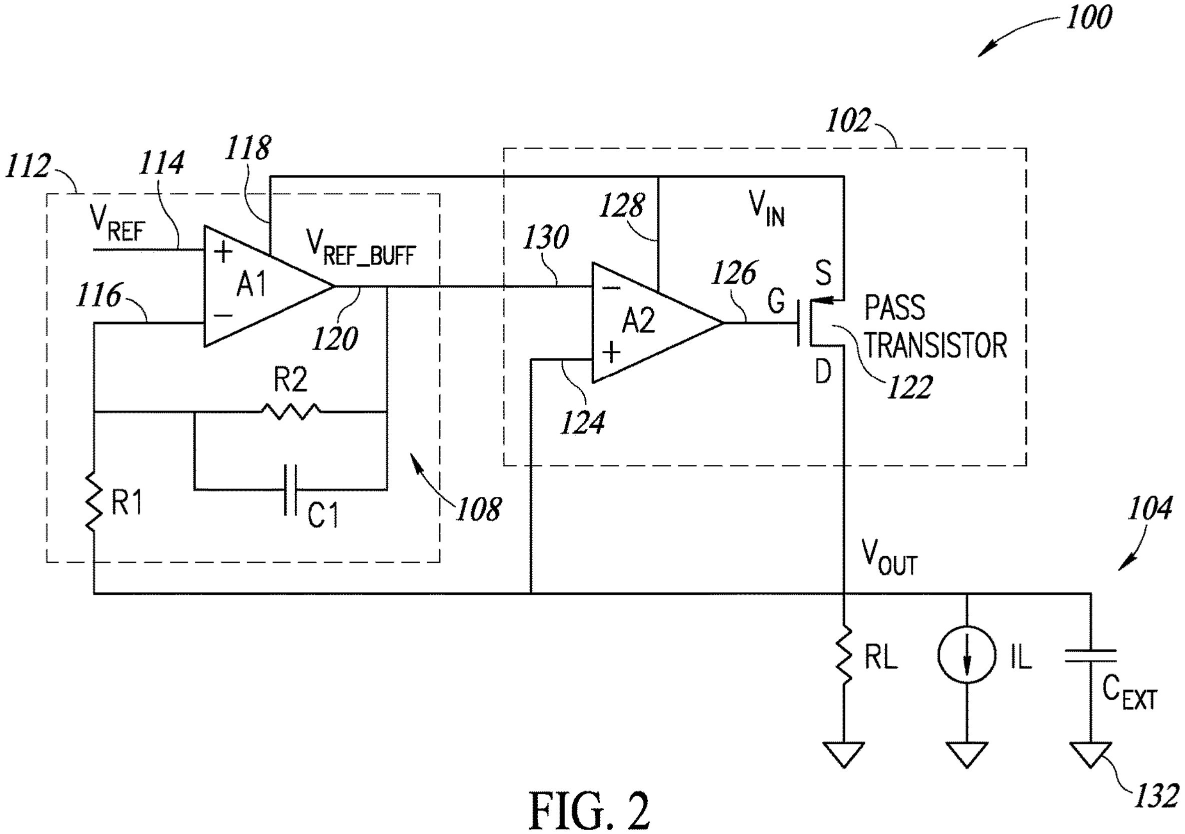
FIG. 2 shows, schematically and in greater detail, the voltage regulator circuit of FIG. 1.

A reference voltage $V_{REF}$ is inputted into the Op Amp 110 and the second input of the Op Amp 110 is coupled to $V_{OUT}$ through resistor R1 (see FIG. 2). The output of the Op Amp 110 is coupled to a first, negative input of the low-dropout regulator 102. The low-dropout regulator 102 is also coupled to the positive input voltage $V_{IN}$. The load circuit 104 is coupled to the output of the low-dropout regulator 102 and to an output voltage $V_{OUT}$.

The voltage-to-current converter 106, RC filter 108, and Op Amp voltage buffer 110 collectively comprise an inversion and modulation circuit 112.

FIG. 2 is the voltage regulator circuit 100 of FIG. 1 in greater detail. The inversion and modulation circuit 112 includes a first Op Amp A1, a first resistor R1, a second resistor R2, and a first capacitor C1. The first Op Amp A1 has a first positive voltage supply node 118, which is supplied by the positive input voltage $V_{IN}$. The first Op Amp A1 has a first positive input 114. The reference voltage $V_{REF}$ is coupled to the first positive input 114 of the first Op Amp A1. The first Op Amp A1 also has a first negative input 116 and a first output 120. The first output 120 of the first Op Amp A1 is the reference voltage $V_{REF}$ once it has been buffered, a buffered reference voltage $V_{REF\text{-}BUFF}$.

The first capacitor C1 and the second resistor R2 are coupled in parallel and collectively form the RC filter 108. The RC filter 108 is coupled between the first output 120 of the first Op Amp A1 and the first negative input 116 of the first Op Amp A1. Thus, the first output 120 of the first Op Amp A1 is coupled to the first negative input 116, forming the Op Amp voltage buffer 110 of FIG. 1.

The low-dropout regulator 102 is coupled to the output 120 of the first Op Amp A1. The low-dropout regulator 102 includes a second Op Amp A2 and a pass transistor 122. The second Op Amp A2 has a second positive voltage supply node 128, which is coupled to the positive input voltage $V_{IN}$. The second Op Amp A2 has a second positive input 124 and a second negative input 130, the second negative input 130 being coupled directly to the output 120 of the first Op Amp A1. That is, the buffered reference voltage $V_{REF\text{-}BUFF}$, which is the output of the Op Amp voltage buffer 110 of FIG. 1, is inputted into the second negative input 130.

The second Op Amp A2 also has an output 126, which is directly coupled to a gate G of the pass transistor 122. A source S of the pass transistor 122 is coupled to the positive input voltage $V_{IN}$ and to the second positive voltage supply node 128 of the second Op Amp A2.

The first positive voltage supply node 118, the second positive voltage supply node 128, and the source S of the pass transistor 122 are each coupled to one another and are each coupled to the positive input voltage $V_{IN}$.

The load circuit 104 is coupled to the pass transistor 122 of the low-dropout regulator 102. More specifically, the load circuit 104 is coupled to a drain D of the pass transistor 122. The load circuit 104 is also coupled to the output voltage $V_{OUT}$ and to second positive input 124 of the second Op Amp A2. It is noted that source and drain can be interchangeable and the specific use of source S and drain D are used to simplify the discussion.

The load circuit 104 includes a resistor circuit RL, a current sink IL, and an external capacitor $C_{EXT}$, which are each coupled in parallel. The resistor circuit RL, current sink IL, and external capacitor $C_{EXT}$ are each coupled to a ground voltage 132. The current sink IL represents the load current of the device, which is dynamic.

The load circuit 104 is coupled to the inversion and modulation circuit 112 directly through the first resistor R1. The first resistor R1 is coupled between the load circuit 104 and the first negative input 116 of the first Op Amp A1. The first resistor R1 is also coupled between the load circuit 104 and the RC filter 108.

Additionally, the first negative input 116 of the first Op Amp A1 is coupled to the second negative input 130 of the second Op Amp A2 through the RC filter 108.

The voltage regulator circuit 100 of the present disclosure maintains both stability and regulation accuracy without sacrificing bandwidth or cost. When voltage regulators receive a load current that can have different values across a wide range, it is difficult to stabilize the system. Other known voltage regulators include a much larger external capacitor than the external capacitor $C_{EXT}$ of the present disclosure, which improves accuracy at a high load current, but a larger external capacitor increases the size and cost of the system while decreasing bandwidth. The voltage regulator circuit 100 of the present disclosure utilizes a smaller external capacitor $C_{EXT}$, which allows the overall size of the voltage regulator circuit 100 to remain small and the bandwidth to remain high. Higher bandwidth corresponds to a decrease in the reaction time of the regulator in response to a change in the load current.

Additionally, when other known voltage regulators use a smaller external capacitor, the DC (Direct Current) gain is compromised in exchange for a more stable system. The voltage regulator circuit 100 of the present disclosure uses fully analog reference correction circuitry, which senses the drop in voltage between the output and input and corrects the reference voltage $V_{REF}$, accordingly, to keep the output voltage $V_{OUT}$ unchanged. The reference correction circuitry is implemented as an inverting amplifier configuration where the change in the output voltage $V_{OUT}$ is converted into a proportional current and added to the reference voltage $V_{REF}$. The reference correction circuitry of the present disclosure compromises neither the DC gain nor the stability of the circuit.

Figure 3:
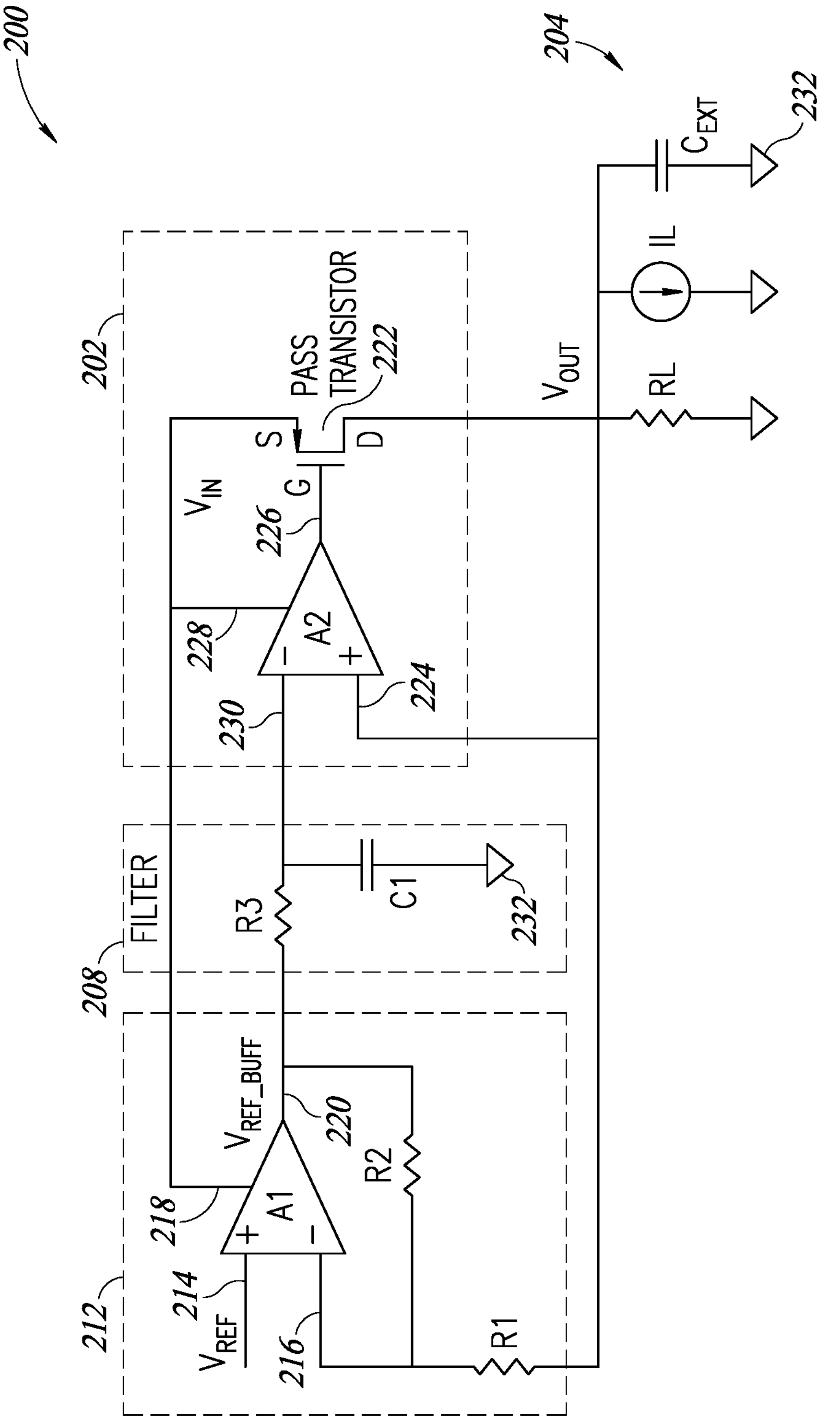
FIG. 3 schematically shows a second embodiment of a voltage regulator circuit with reference modulation.

FIG. 3 is an alternative embodiment of the voltage regulator circuit 100 of FIGS. 1 and 2. The voltage regulator circuit 200 of FIG. 3 includes a low-dropout regulator 202, a load circuit 204, an inversion and modulation circuit 212, and an RC filter 208. Unlike in the embodiment depicted in FIGS. 1 and 2, the RC filter 208 of the voltage regulator circuit 200 is not included in the inversion and modulation circuit 212. Instead, the inversion and modulation circuit 212 only includes an Op Amp voltage buffer and a voltage-to-current converter.

The inversion and modulation circuit 112 includes a first Op Amp A1, a first resistor R1, and a second resistor R2. The first Op Amp A1 has a first positive voltage supply node 218, which is coupled to a positive input voltage $V_{IN}$. The first Op Amp A1 has a first positive input 214. The reference voltage $V_{REF}$ is coupled to the first positive input 214 of the first Op Amp A1. The first Op Amp A1 also has a first negative input 216 and a first output 220. The first output 220 of the first Op Amp A1 is the reference voltage $V_{REF}$ once it has been buffered $V_{REF\text{-}BUFF}$.

The first output 220 of the first Op Amp A1 is coupled to the first negative output 216 of the first Op Amp A1 through the second resistor R2.

The RC filter 208 is coupled directly to the first output 220 of the first Op Amp A1. That is, the buffered reference voltage $V_{REF\text{-}BUFF}$, which is the output of the Op Amp voltage buffer 110 of FIG. 1, is inputted directly into the RC filter 208.

The RC filter 208 includes a third resistor R3 and a first capacitor C1 (which can be formed by MOS and MOM), which are coupled in parallel. The third resistor R3 is coupled directly to the first output 220 of the first Op Amp A1. The first capacitor C1 is coupled to the third resistor R3 and coupled directly to a ground voltage 232, which can be 0V.

The low-dropout regulator 202 is coupled to the output 220 of the first Op Amp A1 through the RC filter 208. The low-dropout regulator 202 includes a second Op Amp A2 and a pass transistor 222. The second Op Amp A2 has a second positive voltage supply node 228, which is coupled to the positive input voltage $V_{IN}$. The second Op Amp A2 has a second positive input 224 and a second negative input 230, the second negative input 230 being coupled directly to the RC filter 208.

The first negative input 216 of the first Op Amp A1 is coupled to the second negative input 220 of the second Op Amp A2 through the RC filter 208 and the second resistor R2. The second negative input 220 of the second Op Amp A2 is coupled directly to the third resistor R3 of the RC filter 208. The first capacitor C1 is coupled between the third resistor R3 and the second negative input 220 of the second Op Amp A2.

The second Op Amp A2 also has a second output 226, which is directly coupled to a gate G of the pass transistor 222. A source S of the pass transistor 222 is coupled to the positive input voltage $V_{IN}$ and to the second positive voltage supply node 228 of the second Op Amp A2.

The first positive voltage supply node 218, the second positive voltage supply node 228, and the source S of the pass transistor 222 are each coupled to one another and are each coupled to the positive input voltage $V_{IN}$.

The load circuit 204 is coupled to the pass transistor 222 of the low-dropout regulator 202. More specifically, the load circuit 204 is coupled to a drain D of the pass transistor 222.

The load circuit 204 is also coupled to the output voltage $V_{OUT}$ and to second positive input 224 of the second Op Amp A2.

The load circuit 204 includes a resistor circuit RL, a current sink IL, and an external capacitor $C_{EXT}$, which are each coupled in parallel. The resistor circuit RL, current sink IL, and external capacitor $C_{EXT}$ are each coupled to the ground voltage 232.

The load circuit 204 is coupled to the inversion and modulation circuit 212 directly through the first resistor R1. The first resistor R1 is coupled between the load circuit 204 and the first negative input 216 of the first Op Amp A1. The first resistor R1 is also coupled between the load circuit 204 and the second resistor R2.

The first capacitor C1 can be formed using a MOS (metal-oxide-semiconductor) transistor. The first capacitor C1 can be formed using a MOM (metal-oxide-metal) transistor.

While the performance of the voltage regulator circuit 200 of FIG. 3 is similar to the performance of the voltage regulator circuit 100 in FIGS. 1 and 2, the advantage of having the first capacitor C1 grounded is that, when the first capacitor C1 is formed using a MOS, it takes up a smaller area. Thus, the voltage regulator circuit 200 is smaller in size.

There are many advantages of the architecture of the present disclosure. First, the accuracy of the system is improved by the reference correction circuitry. Further, the solution is completely analog, and the stability of the circuit is not compromised by the small external capacitor $C_{EXT}$. The present disclosure achieves improved load regulation over other known solutions without increasing the size of the external capacitor $C_{EXT}$.

The present disclosure includes a low-dropout regulator circuit comprising a first amplifier circuit with a positive input node, a negative input node, and an output node, and a pass transistor coupled to the output node of the first amplifier. A load circuit is coupled to the positive input node of the first amplifier circuit, the load circuit comprising a resistor circuit, a current sink, and an external capacitor. A buffer circuit is coupled to the negative input node of the first amplifier circuit, the buffer circuit comprising a second amplifier circuit with a positive input node, a negative input node, and an output node. The output node of the second amplifier circuit is coupled to the negative input node of the first amplifier circuit. A filter circuit is coupled between the output node of the second amplifier circuit and the negative input node of the second amplifier circuit, the filter circuit comprising a capacitor and a first resistor.

A gate of the pass transistor is coupled directly to the output node of the first amplifier circuit. The capacitor and the first resistor of the filter circuit are coupled in parallel. The output of the second amplifier circuit is coupled directly to the negative input node of the first amplifier circuit.

A second resistor is coupled between the filter circuit and the load circuit. The second resistor is coupled to the negative input node of the second amplifier circuit. The positive input node of the first amplifier circuit is coupled to the load circuit.

Embodiments also include a circuit comprising a first amplifier circuit with a first positive input, a first negative input, and a first output. The circuit further comprises a second amplifier circuit with a second positive input, a second negative input coupled to the first output and the first negative input, and a second output. A load circuit is coupled between the second positive input and the second output and a pass transistor is coupled directly to the second output and coupled between the second output and the load circuit. A filter circuit is coupled between the first output and the first negative input.

The load circuit includes a resistor circuit, a current sink, and an external capacitor. The filter circuit includes a first resistor and a first capacitor, the first resistor and the first capacitor being coupled in parallel. A second resistor is coupled between the filter circuit and the load circuit. A reference voltage is coupled to the first positive input.

Embodiments also include a circuit comprising a first operational amplifier with a first positive voltage supply node, a first positive input, a first negative input, and a first output coupled to the first negative input. A reference voltage is coupled to the first positive input. The circuit further includes a second operational amplifier with a second positive voltage supply node, a second positive input, a second negative input coupled to the first output and the first negative input, and a second output. A load circuit is coupled between the second positive input and the second output and a pass transistor is coupled between the second output and the load circuit. A filter circuit is coupled between the first output and the second negative input.

A first resistor is coupled between the first output and the first negative input. The filter circuit comprises a second resistor and a first capacitor. The second resistor is coupled directly between the first output and the second negative input. An input voltage is coupled to the first positive voltage supply node, the second positive voltage supply node, and a source of the pass transistor.

The first capacitor is coupled to a ground voltage. The load circuit includes a resistor circuit, a current sink, and a second capacitor.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a low-dropout regulator circuit, including:

- a first amplifier circuit with a positive input node, a negative input node, and an output node; and
- a pass transistor coupled to the output node of the first amplifier circuit;

a load circuit coupled to the positive input node of the first amplifier circuit, the load circuit including;

- a resistor circuit;
- a current sink; and
- an external capacitor;

a buffer circuit coupled to the negative input node of the first amplifier circuit, the buffer circuit including:

- a second amplifier circuit with a positive input node, a negative input node, and an output node, the output node of the second amplifier circuit is coupled to the negative input node of the first amplifier circuit;
- a first resistor coupled between the negative input node of the second amplifier circuit and the load circuit; and a second resistor coupled between the output node and the negative input node of the second amplifier circuit; and a filter circuit coupled between the output node of the second amplifier circuit and the negative input node of the first amplifier circuit, the filter circuit including a capacitor and a third resistor, the third resistor being coupled between the output node of the second amplifier circuit and the negative input node of the first amplifier circuit.

2. The device of claim 1, wherein a gate of the pass transistor is coupled directly to the output node of the first amplifier circuit.

3. The device of claim 1, wherein the capacitor and the first resistor of the filter circuit are coupled in series.

4. The device of claim 1, wherein the output node of the second amplifier circuit is coupled to the negative input node of the first amplifier circuit.

5. The device of claim 1, wherein the second resistor is coupled between the filter circuit and the load circuit.

6. The device of claim 5, wherein the second resistor is coupled between the negative input node of the second amplifier circuit and the output node of the second amplifier circuit.

7. The device of claim 1, wherein the positive input node of the first amplifier circuit is coupled to the load circuit.

8. A circuit comprising:

a first amplifier circuit with a first positive input, a first negative input, and a first output, the first amplifier circuit including:

a first resistor; and a second resistor coupled between the first negative input and the first output;

a second amplifier circuit with a second positive input, a second negative input coupled to the first output and the first negative input, and a second output;

a load circuit coupled between the second positive input and the second output, the first resistor being coupled between the first negative input and the load circuit;

a pass transistor coupled directly to the second output and coupled between the second output and the load circuit; and a filter circuit coupled between the first output and the second negative input, the filter circuit including:

a third resistor coupled between the first output and the second negative input.

9. The circuit of claim 8, wherein the load circuit includes a resistor circuit, a current sink, and an external capacitor.

10. The circuit of claim 8, wherein the filter circuit includes a first capacitor.

11. The circuit of claim 10, wherein the first capacitor is coupled to a ground voltage.

12. The circuit of claim 8, wherein the second resistor is coupled between the filter circuit and the load circuit.

13. The circuit of claim 8, wherein a reference voltage is coupled to the first positive input.

14. A circuit comprising:

a first operational amplifier with a first positive voltage supply node, a first positive input, a first negative input, and a first output coupled to the first negative input;

a first resistor coupled to the first negative input;

a second resistor coupled between the first output and the first negative input;

a reference voltage coupled to the first positive input;

a second operational amplifier with a second positive voltage supply node, a second positive input, a second negative input coupled to the first output and the first negative input, and a second output;

a load circuit coupled between the second positive input and the second output, the first resistor being coupled to the load circuit;

a pass transistor coupled between the second output and the load circuit; and a filter circuit coupled between the first output and the second negative input, the filter circuit including a third resistor coupled directly between the first output and the second negative input.

15. The circuit of claim 14, wherein the second resistor is coupled to the first output and to the first resistor.

16. The circuit of claim 15, wherein the filter circuit includes a first capacitor.

17. The circuit of claim 16, wherein the third resistor is coupled directly to the first capacitor.

18. The circuit of claim 16, wherein the load circuit includes a resistor circuit, a current sink, and a second capacitor.

19. The circuit of claim 16, wherein the first capacitor is coupled to a ground voltage.

20. The circuit of claim 14, wherein an input voltage is coupled to the first positive voltage supply node, the second positive voltage supply node, and a source of the pass transistor.

* * * * *